US009638502B1

(12) United States Patent
Herting et al.

(10) Patent No.: US 9,638,502 B1
(45) Date of Patent: May 2, 2017

(54) PULSE ERROR CORRECTION FOR SPINNING VEHICLES

(71) Applicant: Rockwell Collins, Inc., Cedar Rapids, IA (US)

(72) Inventors: Brian J. Herting, Marion, IA (US); Jonathan M. Sebast, Cedar Rapids, IA (US); Benjamin K. Oliver, Cedar Rapids, IA (US); James R. Kottman, Cedar Rapids, IA (US); Michael J. Cook, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/461,904

(22) Filed: Aug. 18, 2014

(51) Int. Cl.
 *F42B 15/01* (2006.01)

(52) U.S. Cl.
 CPC .................................. *F42B 15/01* (2013.01)

(58) Field of Classification Search
 CPC .. B60K 23/0808; B60K 28/16; B60K 28/165; B60W 10/04; B60W 10/18; B60W 2520/10; B60W 2520/125; B60W 2520/14; B60W 2520/28; B60W 2540/10; B60W 2710/0616; B60W 2710/105; B60W 30/02; B60W 30/188; B60W 50/10; F41G 7/305; F41G 7/346; F42B 15/01; G01S 19/21; H01Q 13/10; H01Q 1/28; H01Q 1/281; H01Q 21/28; H01Q 9/42
 USPC ........ 701/38, 48, 96, 99, 110, 301; 116/200; 244/3.1, 164, 3.16; 180/6.5, 197, 248, 180/249; 192/104 R; 342/16, 357.59; 303/113.4; 280/6.15; 102/384; 343/705; 89/41.22, 204; 124/87; 235/404; 434/20, 22
 See application file for complete search history.

(56) References Cited

U.S. PATENT DOCUMENTS

| | | | | | |
|---|---|---|---|---|---|
| 2,564,698 | A | * | 8/1951 | Hammond, Jr. .......... | F41G 5/18 235/404 |
| 3,072,055 | A | * | 1/1963 | Ross ....................... | F41G 7/222 102/373 |
| 3,609,883 | A | * | 10/1971 | Erhard ..................... | G06G 7/80 434/22 |
| 3,685,159 | A | * | 8/1972 | Erhard ..................... | F41G 3/06 89/204 |
| 3,733,465 | A | * | 5/1973 | Marasco .................. | G06G 7/80 235/404 |
| 3,789,198 | A | * | 1/1974 | Henson .................... | G08G 1/13 116/200 |

(Continued)

*Primary Examiner* — Mussa A Shaawat
*Assistant Examiner* — Sanjeev Malhotra
(74) *Attorney, Agent, or Firm* — Angel N. Gerdzhikov; Donna P. Suchy; Daniel M. Barbieri

(57) ABSTRACT

Apparatus and methods for pulse error correction are disclosed. The apparatus may include a spinning vehicle having a plurality of antennas for generating pulse signals indicative of the rotational orientation of the spinning vehicle. The apparatus may utilize anti-jamming to detect and nullify a jamming signal. The apparatus may apply pulse error correction to correct inaccuracies in the pulse signals indicative of the rotational orientation of the spinning vehicle. More specifically, positional information of a source of the jamming signal relative to the spinning vehicle and positional information of a satellite relative to the spinning vehicle may be determined and utilized to calculate a rotational orientation correction.

20 Claims, 9 Drawing Sheets

(56) References Cited

U.S. PATENT DOCUMENTS

| | | | | |
|---|---|---|---|---|
| 4,823,674 A * | 4/1989 | Nilsson | F41G 3/06 | 235/411 |
| 4,917,609 A * | 4/1990 | Eichweber | G02B 23/10 | 434/20 |
| 5,597,143 A * | 1/1997 | Surauer | B64G 1/24 | 244/164 |
| 5,734,595 A * | 3/1998 | Matsuno | B60K 23/0808 | 180/197 |
| 5,826,209 A * | 10/1998 | Matsuno | B60K 23/0808 | 180/248 |
| 6,520,448 B1 * | 2/2003 | Doty | F42B 15/01 | 244/3.1 |
| 6,825,804 B1 * | 11/2004 | Doty | F41G 7/346 | 342/357.59 |
| 8,077,099 B1 * | 12/2011 | Wesh | H01Q 1/28 | 102/384 |
| 8,138,982 B1 * | 3/2012 | West | F42B 15/01 | 102/384 |
| 8,159,403 B1 * | 4/2012 | Chen | H01Q 1/281 | 343/705 |
| 2001/0042652 A1 * | 11/2001 | Watson | B60K 17/342 | 180/249 |
| 2002/0022927 A1 * | 2/2002 | Lemelson | G01S 19/11 | 701/301 |
| 2004/0140174 A1 * | 7/2004 | Kano | B60K 28/165 | 192/104 R |
| 2004/0245850 A1 * | 12/2004 | Sakai | B60T 8/1766 | 303/113.4 |
| 2006/0074534 A1 * | 4/2006 | Geborek | B60R 21/0132 | 701/38 |
| 2007/0162203 A1 * | 7/2007 | Yasutake | B60W 10/04 | 701/38 |
| 2008/0015755 A1 * | 1/2008 | Kuwahara | B60W 10/04 | 701/48 |
| 2008/0290618 A1 * | 11/2008 | Yanaka | B60G 3/01 | 280/6.15 |
| 2008/0312802 A1 * | 12/2008 | Kaigawa | B60W 30/16 | 701/96 |
| 2010/0289687 A1 * | 11/2010 | Vander Velde | F41G 7/222 | 342/16 |
| 2011/0120438 A1 * | 5/2011 | Samuels | F41G 1/467 | 124/87 |
| 2011/0232977 A1 * | 9/2011 | Trowell | B60L 3/102 | 180/6.5 |
| 2014/0229087 A1 * | 8/2014 | Keates | F02D 41/086 | 701/99 |
| 2014/0372012 A1 * | 12/2014 | Darnell | B60W 50/10 | 701/110 |

* cited by examiner

PULSE ERROR CORRECTION FOR SPINNING VEHICLES

BACKGROUND

In many applications, such as artillery shell or missile guidance, the vehicle to be guided is a spinning vehicle. Guidance systems integral to such spinning vehicles require significant real-time processing capacity. This is because the sensor inputs and guidance actuator controls may need to be corrected to account for effects of the spinning body. The ability to determine the rotational orientation of a spinning vehicle in real-time is important for neutralizing unwanted rotational artifacts for the spinning vehicle.

SUMMARY

Embodiments of the inventive concepts disclosed herein are directed to an apparatus. The apparatus includes a spinning vehicle having a plurality of antennas for generating a pulse signal indicative of a rotational orientation of the spinning vehicle. The apparatus also includes an anti-jamming processor positioned on the spinning vehicle and configured to detect and nullify a jamming signal. The apparatus further includes a correction processor positioned on the spinning vehicle. The correction processor is configured to determine positional information of a source of the jamming signal relative to the spinning vehicle, to determine positional information of a satellite relative to the spinning vehicle, and to calculate a rotational orientation correction to offset the rotational orientation indicated by the pulse signal at least partially based on the positional information of the source of the jamming signal relative to the spinning vehicle and the positional information of the satellite relative to the spinning vehicle.

In one aspect, the inventive concepts disclosed herein are directed to a method. The method includes: generating a pulse signal indicative of a rotational orientation of a spinning vehicle; detecting a jamming signal; nullifying the jamming signal; determining positional information of a source of the jamming signal relative to the spinning vehicle; determining positional information of a satellite relative to the spinning vehicle; and calculating a rotational orientation correction to offset the rotational orientation indicated by the pulse signal at least partially based on the positional information of the source of the jamming signal relative to the spinning vehicle and the positional information of the satellite relative to the spinning vehicle.

A further embodiment of the present disclosure is also directed to a method. The method includes: generating a pulse signal indicative of a rotational orientation of a spinning vehicle, the pulse signal being generated based on a navigation signal received at an antenna mounted on the spinning vehicle; detecting a jamming signal; nullifying the jamming signal; determining positional information of a source of the jamming signal relative to the spinning vehicle, including: a roll angle of the jammer relative to the spinning vehicle, and an incidence angle of the jammer relative to the spinning vehicle; determining positional information of a satellite relative to the spinning vehicle, including: a roll angle of the satellite relative to the spinning vehicle, and an incidence angle of the satellite relative to the spinning vehicle; and calculating a rotational orientation correction to offset the rotational orientation indicated by the pulse signal at least partially based on: the roll angle of the satellite relative to the spinning vehicle, the incidence angle of the satellite relative to the spinning vehicle, the roll angle of the jammer relative to the spinning vehicle, and the incidence angle of the jammer relative to the spinning vehicle.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Global Positioning System (GPS) technologies such as Advanced Spinning Vehicle Navigation (ASVN) have been developed to address the special navigational needs of spinning vehicles. Such technologies use the amplitude and phase modulation of the signals received by a GPS antenna on a spinning vehicle to track the rotational orientation of the spinning vehicle. The development and usage of ASVN is described in: Spinning-vehicle navigation using apparent modulation of navigational signals, J. Doty et al., U.S. Pat. No. 6,520,448, which is herein incorporated by reference in its entirety.

Figure 1:
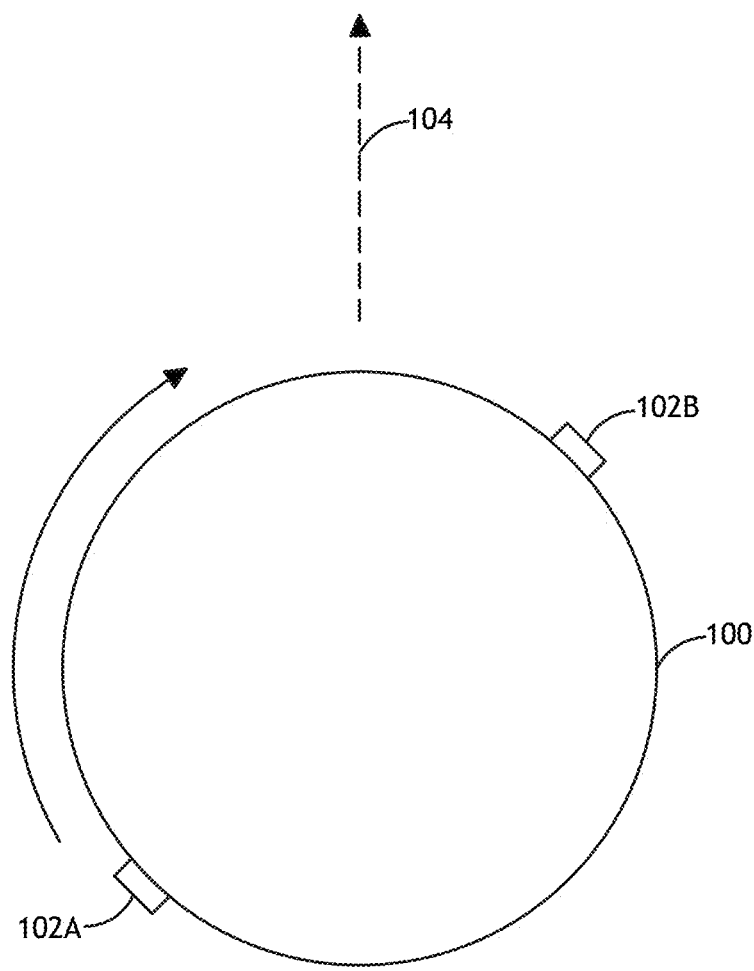
FIG. 1 is a rear view of a spinning vehicle.

ASVN may generate accurate pulse signals to indicate the rotational orientation of a spinning vehicle by integrating power over an integer number of rotations of the vehicle with a priori knowledge of the radiation patterns of antennas positioned on the spinning vehicle. For example, as depicted in a rear view of a spinning vehicle 100 shown in FIG. 1, one or more antennas 102A and 102B may be mounted around the perimeter of the spinning vehicle 100. If more than one antenna is utilized, one of the antennas may be designated as the reference antenna. For illustrative purposes, suppose antenna 102A is designated as the reference antenna. A signal (e.g., a pulse) may be generated whenever antenna 102A is rotated to a predetermined rotational orientation 104, providing a signal source for indicating the rotational orientation of the spinning vehicle.

It is noted that because signals received by GPS receivers are generally low power signals, they are vulnerable to being overwhelmed by interfering signals from malicious and/or non-malicious sources (e.g., emitters or jammers). It is noted that the accuracy of the navigation data provided by ASVN may be affected in the presence of jammers. Embodiments of the inventive concepts disclosed herein are directed to anti-jamming while spinning. More specifically, GPS signals are processed to provide accurate navigation information to a spinning vehicle in the presence of a jammer.

One important aspect of providing accurate navigation information includes providing accurate information of Position, Velocity and Time (PVT). To provide accurate PVT, embodiments of the inventive concepts disclosed herein may utilize digital nulling to successfully receive, demodulate, and track GPS satellite signals in the presence of jamming signals. For instance, conventional digital nulling techniques may set beam constraints such that the reference channel is a weighted sum of individual Radio Frequency (RF) channels. Beam constraints are utilized to combine the RF channels to increase the signal-to-noise ratio compared to simply using a single RF reference channel. It is contemplated that other digital nulling techniques may also be utilized alternatively and/or additionally to improve the accuracy of PVT in the presence of jamming signals without departing from the broad scope of the inventive concepts disclosed herein.

While implementing digital nulling improves the accuracy of PVT, an adverse effect of digital nulling is that as weights are put on the RF channels to nullify the noises, the weights also change the radiation patterns of the antennas 102A and 102B. That is, for the spinning vehicle 100, the digital nulling implementation may change the effective antenna radiation patterns of the antennas 102A and 102B multiple times during a single revolution. Changing the antenna radiation patterns of the antennas 102A and 102B may cause inaccurate pulse signal generation. For instance, instead of generating a pulse signal precisely at the instance when the reference antenna 102A coincides with the predetermined rotational orientation 104, the pulse signal may be generated at a slightly earlier or later time, which causes inaccuracies in navigation systems that utilize the pulse signal. Therefore, it is important to determine how the radiation pattern changes (due to digital nulling) impact the pulse signal generation, and to determine the amount of corrections needed to improve the accuracy of the rotational orientation determined from the generated pulse signal.

Embodiments of the inventive concepts disclosed herein may utilize the locations of a positioning system (e.g., GPS) satellite and a jammer relative to the spinning vehicle to determine whether any corrections need to be applied to the pulse signals. The location of the satellite may be taken into consideration because it determines the pulse signal corrections given the radiation pattern of the antennas. The location of the jammer may be taken into consideration because it drives the operations of digital nulling, which in turn impact the effective radiation pattern of the antennas. The relative locations of the jammer and the satellite to the spinning vehicle therefore determine the impact on the pulse signal accuracy.

The location of the satellite may be determined accurately from ephemeris data (e.g., based on GPS navigation information). The location of the jammer, on the other hand, may be unknown and may need to be determined. It is contemplated that various techniques may be utilized to estimate/calculate the location of the jammer. For purposes of continuing discussion with respect to pulse signal correction, exemplary techniques for estimating the location of the jammer will be described below.

Figure 2:
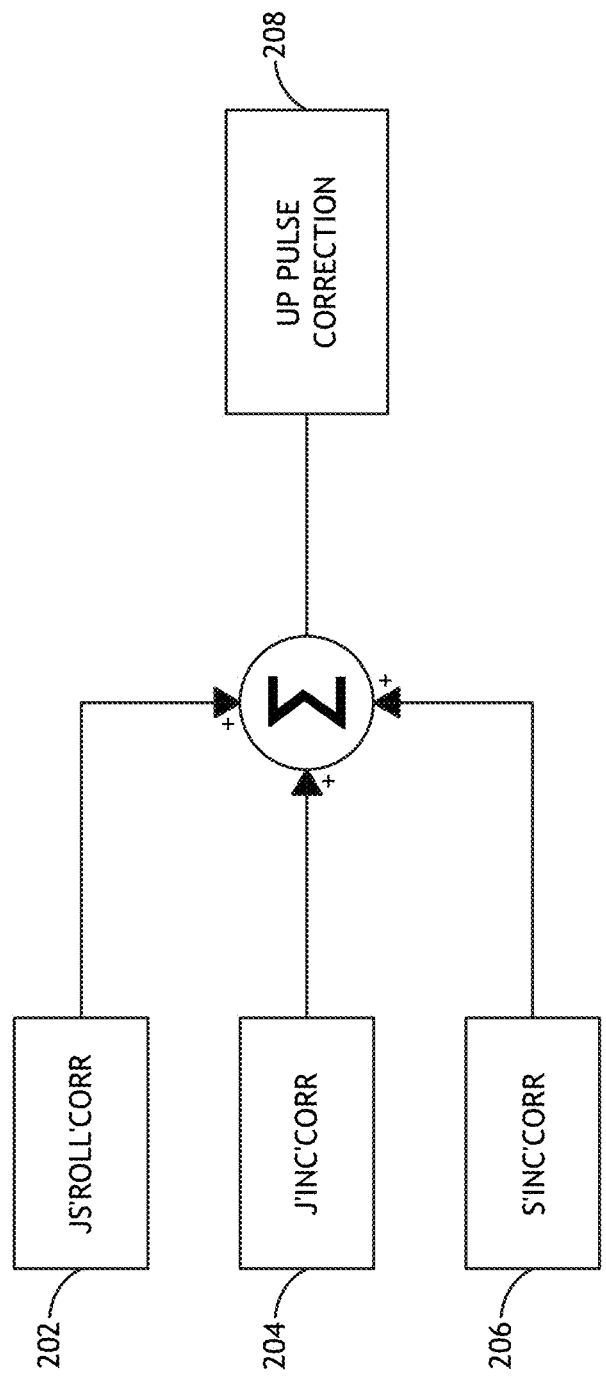
FIG. 2 is a block diagram depicting a pulse error correction calculation according to an embodiment of the inventive concepts disclosed herein.

Once the location of the satellite and the location of the jammer are determined, a process to determine whether to apply corrections to the pulse signals may be invoked. Referring to FIG. 2, an illustration depicting various types of corrections 202, 204, and 206 that may be taken into consideration to calculate the pulse signal correction 208 in accordance with some embodiments of the inventive concepts disclosed herein is shown. More specifically, correction 202 represents the jammer-to-satellite roll correction, correction 204 represents the jammer incidence correction, and correction 206 represents the satellite incidence correction. Each of the corrections 202, 204, and 206 are described in details below.

Figure 3:
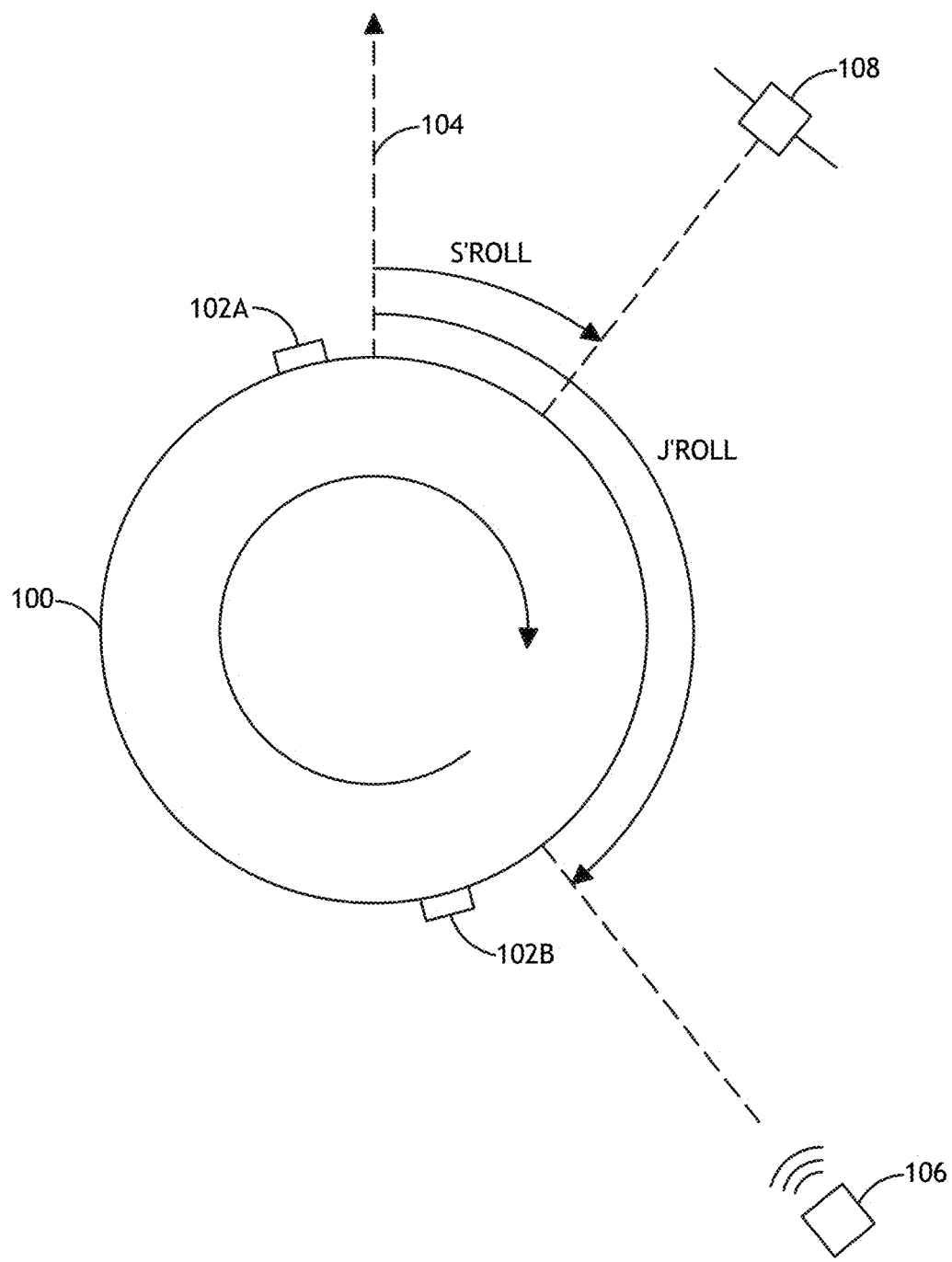
FIG. 3 is an illustration depicting roll angles defined according to an embodiment of the inventive concepts disclosed herein.
Figure 4:
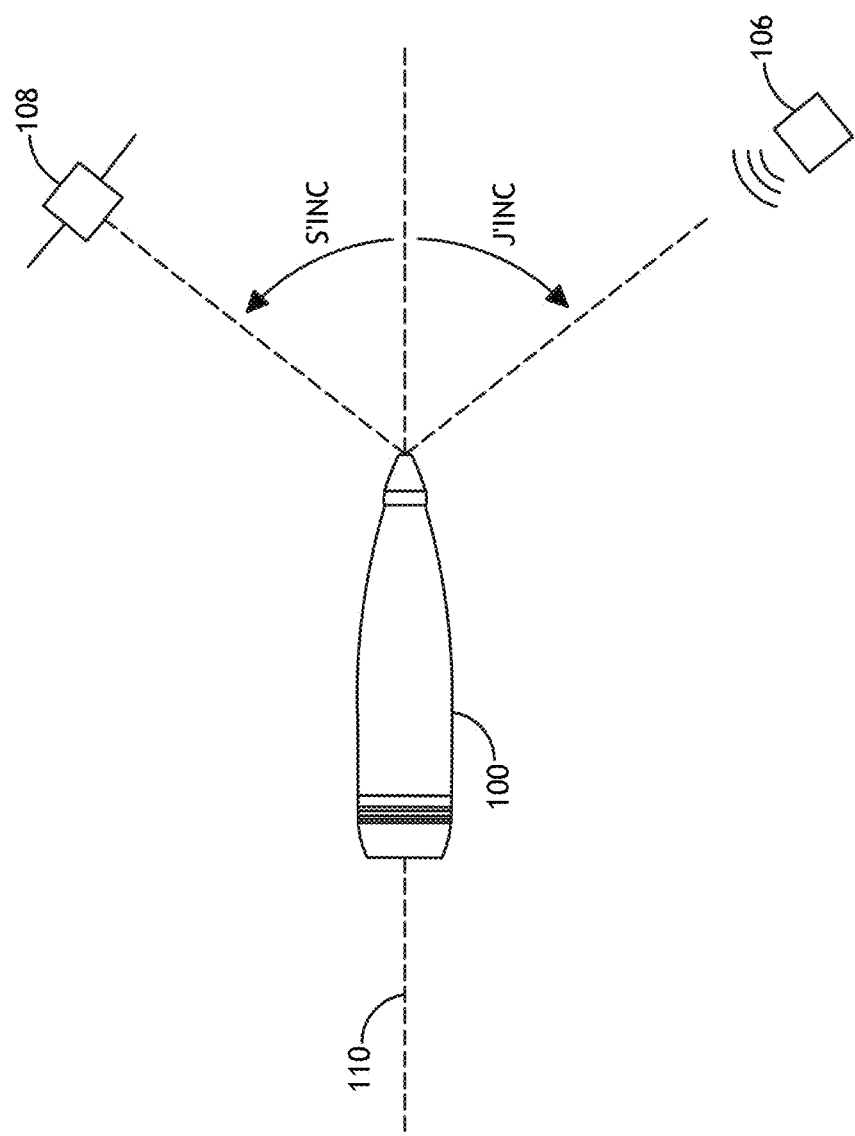
FIG. 4 is an illustration depicting incidence angles defined according to an embodiment of the inventive concepts disclosed herein.

Referring generally to FIGS. 3 and 4, illustrations depicting roll angles and incidence angles are shown. The roll angle of a jammer 106 (denoted as J'ROLL) is defined as the angle between the incoming signal from the jammer 106 and the predetermined rotational orientation 104 for generating the pulse signal. The roll angle of the satellite 108 (denoted as S'ROLL) is defined as the angle between the incoming signal from the satellite 108 and the predetermined rotational orientation 104. In addition, the incidence angle of the jammer 106 (denoted as J'INC) is defined as the angle between the incoming signal from the jammer 106 and the spinning axis 110 of the spinning vehicle 100. Furthermore, the incidence angle of the satellite 108 (denoted as S'INC) is defined as the angle between the incoming signal from the satellite 108 and the spinning axis 110 f the spinning vehicle 100.

Figure 5:
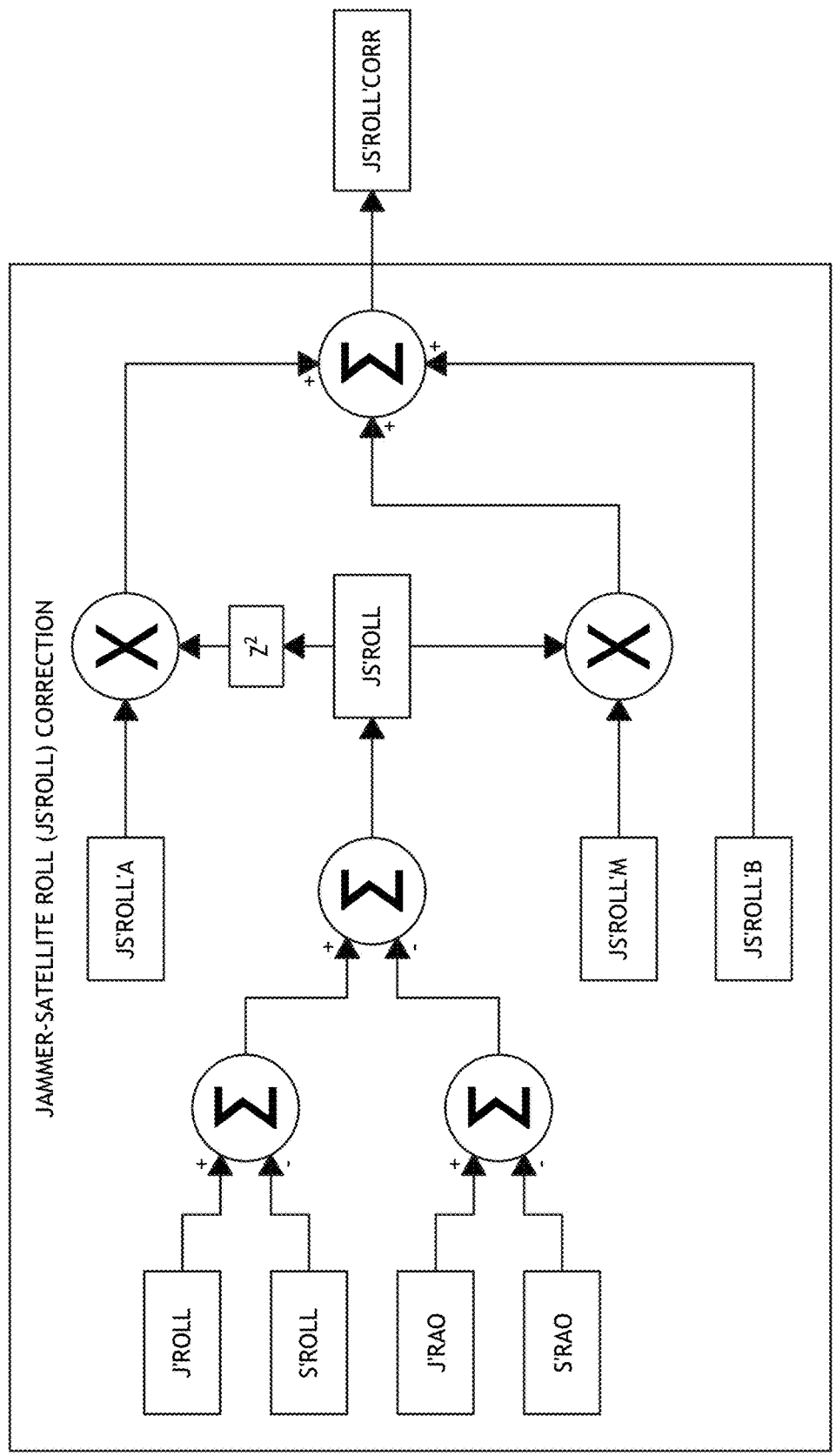
FIG. 5 is a block diagram depicting a jammer-to-satellite roll correction calculation according to an embodiment of the inventive concepts disclosed herein.
Figure 6:
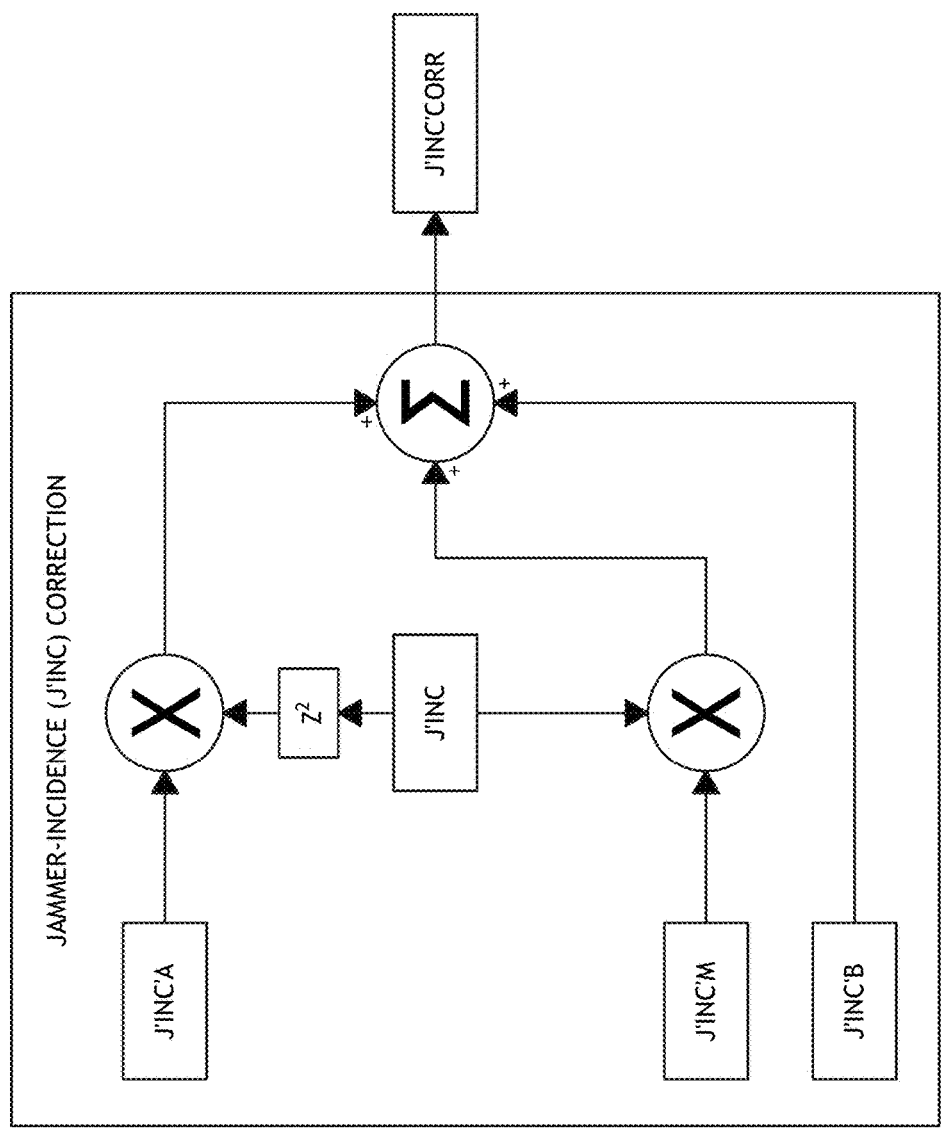
FIG. 6 is a block diagram depicting a jammer incidence correction calculation according to an embodiment of the inventive concepts disclosed herein.
Figure 7:
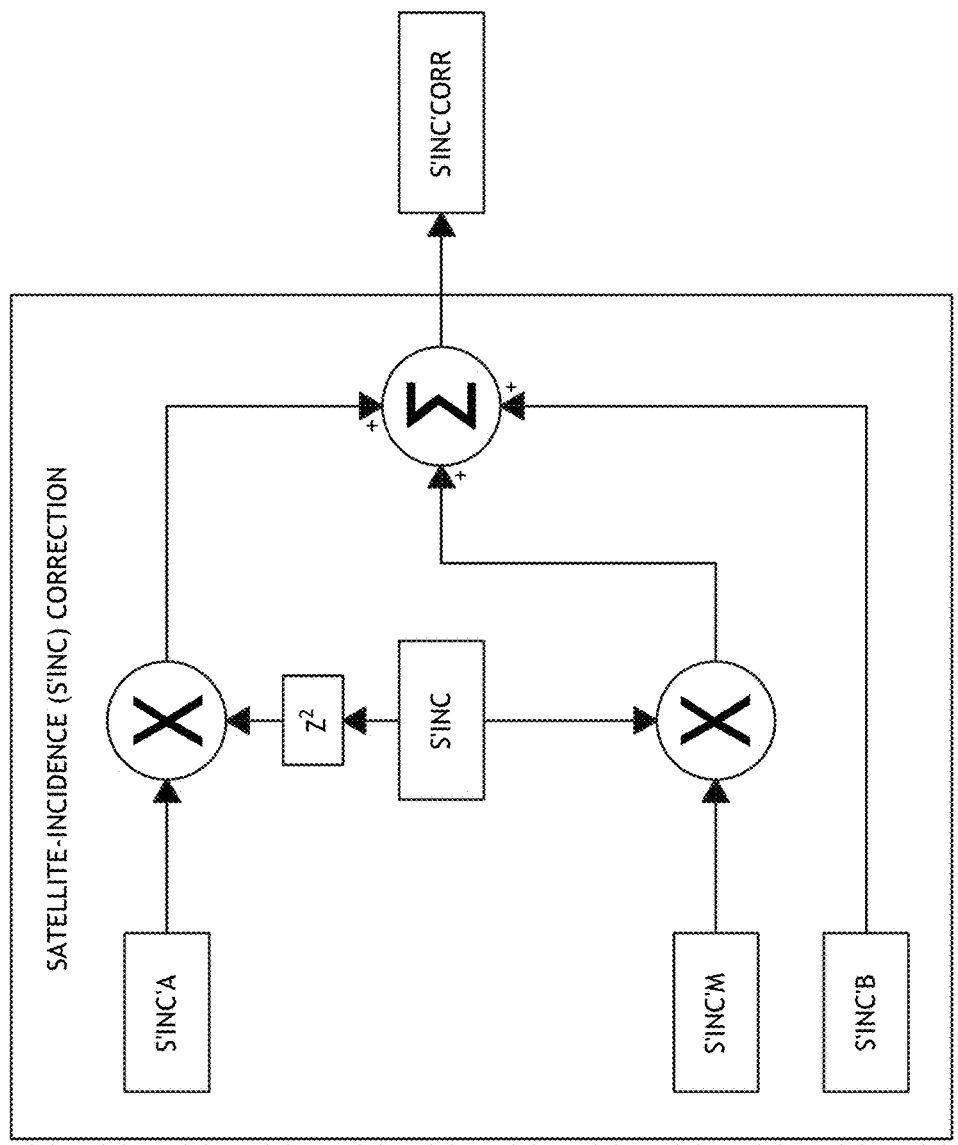
FIG. 7 is a block diagram depicting a satellite incidence correction calculation according to an embodiment of the inventive concepts disclosed herein.

Based on the roll angles and incidence angles defined above, the jammer-to-satellite roll correction 202, the jammer incidence correction 204, and the satellite incidence correction 206 may be calculated accordingly. FIGS. 5 through 7 are illustrations depicting the calculations of the jammer-to-satellite roll correction 202, the jammer incidence correction 204, and the satellite incidence correction 206 in accordance with some embodiments of the inventive concepts disclosed herein.

As shown in FIG. 5, the jammer-to-satellite roll correction 202 (denoted as JS'ROLL'CORR) may be calculated at least partially based on the roll angle of the jammer J'ROLL and the roll angle of the satellite S'ROLL. In addition, it is noted that the incidence angle of the jammer J'INC and the incidence angle of the satellite S'INC may also need to be taken into consideration because different incidence angles may be affected differently by the radiation pattern (e.g., the offset from antenna normal of the peak of the antenna beam is generally a function of incidence angle). In some embodiment, roll angle offset (RAO) values are calculated based on the static radiation pattern of the reference antenna. More specifically, RAO is a measure of how far from antenna normal the peak of beam is at each incidence angle along the spinning vehicle from nose (0°) to tail (180°). The RAO typically varies as a function of incidence angle, and for a given antenna, the function can be determined a priori. In some embodiments, J'RAO is the RAO computed from the radiation pattern of the reference antenna at an incidence angle equal to J'INC. Similarly, S'RAO is the RAO computed from the radiation pattern of the reference antenna at an incidence angle equal to S'INC.

Once the values of J'ROLL, S'ROLL, J'RAO and S'RAO are determined, the jammer-to-satellite roll correction, JS'ROLL'CORR, may be calculated based on a quadratic equation as depicted in FIG. 5. It is contemplated that the constants of the quadratic equation, denoted as JS'ROLL'A, JS'ROLL'M and JS'ROLL'B, may be determined based on empirical data.

It is also contemplated that quadratic equations may be utilized for calculations of the jammer incidence correction J'INC'CORR and the satellite incidence correction S'INC'CORR. As shown in FIG. 6, the jammer incidence correction J'INC'CORR may be calculated based on the incidence angle of the jammer J'INC. The constants of the quadratic equation, denoted as J'INC'A, J'INC'M and J'INC'B, may be determined based on empirical data. Similarly, as shown in FIG. 7, the satellite incidence correction S'INC'CORR may be calculated based on the incidence angle of the satellite S'INC. The constants of the quadratic equation, denoted as S'INC'A, S'INC'M, and S'INC'B may also be determined based on empirical data.

Referring back to FIG. 2, once the values of the jammer-to-satellite roll correction JS'ROLL'CORR 202, the jammer incidence correction J'INC'CORR 204, and the satellite incidence correction S'INC'CORR 206 are determined, the pulse signal correction 208 can be calculated as a sum of the correction values. The pulse signal correction 208 can be utilized to offset the rotational orientation of the spinning vehicle 100 indicated by the pulse. Referring to the example depicted in FIG. 1, suppose that the pulse signal is configured to indicate a time instance when the rotational orientation of the spinning vehicle 100 coincides to the predetermined rotational orientation 104. With digital nulling enabled to mitigate jamming, the accuracy of the pulse signal generation may be compromised. As a result, at the time instance when the pulse signal is generated, the actual rotational orientation of the spinning vehicle 100 may coincide to the predetermined rotational orientation 104 offset by a certain amount (due to antenna radiation pattern changes caused by digital nulling). The pulse signal correction 208 as described above effectively provides an estimated value to compensate for this offset, thereby improving the accuracy of the rotational orientation determined based on pulse signals, which in turn improves the accuracies of the navigation systems that utilize the pulse signals.

It is to be understood that the specific equations described above for the calculations of the correction values are merely exemplary. Additional and/or alternative variables and/or equations may be utilized without departing from the broad scope of the inventive concepts disclosed herein.

It is also to be understood that among the four variables utilized for the calculations of the correction values, the roll angle of the satellite S'ROLL and the incidence angle of satellite S'INC can be determined accurately from ephemeris data (e.g., based on GPS navigation information). The roll angle of the jammer J'ROLL and the incidence angle of the jammer J'INC, on the other hand, may need to be estimated. As previously mentioned, various techniques may be utilized to estimate/calculate the location of the jammer relative to the spinning vehicle, and to determine the values of J'ROLL and J'INC accordingly.

In some embodiments, the roll angle of the jammer J'ROLL may be estimated using the following equation:

$$J'ROLL = RR \times \tau + \tan^{-1}\left(\frac{R11_{90} - R22_{90}}{R11_0 - R22_0}\right) + RAO$$

Referring to the exemplary spinning vehicle 100, which includes two antennas 102A and 102B mounted 180° apart around the perimeter of the spinning vehicle 100, two covariance reads at approximately 90° apart in a roll may be recorded in two covariance matrices $M_0$ and $M_{90}$ by each antenna 102A and 102B respectively. The received signal strength can be determined from the diagonal terms of the two covariance matrices. Referring to the equation presented above, RR denotes the roll rate of the spinning vehicle 100 during the covariance reads and $\tau$ denotes the time interval between the pulse signal and the first covariance read. R11 and R22 are the diagonal values of the covariance matrix $$M_0 = \begin{bmatrix} R11_0 & R12_0 \\ R21_0 & R22_0 \end{bmatrix}$$

and $$M_{90} = \begin{bmatrix} R11_{90} & R12_{90} \\ R21_{90} & R22_{90} \end{bmatrix},$$

representing the voltage power received from antenna 102A and antenna 102B respectively, with the subscripts 0 and 90 indicating the relative angle in degrees between the two sets of covariance data. The last term in the equation, RAO, represents the roll angle offset of the antenna (e.g., the skew in the antenna beam peak), which may be expressed as a function of the incidence angle of the jammer signal as previously described.

It is noted that the two covariance reads recorded at approximately 90° apart in a roll as describe above is merely exemplary. Because two antennas 102A and 102B are mounted 180° apart on the exemplary spinning vehicle 100, two reads at approximately 90° apart in a roll may be sufficient for collecting North-South and East-West signals (e.g., at approximately $\Delta°$, $\Delta+\pi°$, $\Delta+180°$, and $\Delta+270°$ about the spinning axis, where $\Delta°$ represents the predetermined rotational orientation) for direction finding purposes. It is to be understood that the number of covariance reads to be recorded, and the number of antennas mounted on the spinning vehicle 100 are not limited to the examples described above. In addition, various other techniques may also be utilized to estimate the roll angle of the jammer J'ROLL and/or the incidence angle of the jammer J'INC without departing from the broad scope of the inventive concepts disclosed herein.

For instance, an iterative approach may also be utilized where an initial incidence angle of the jammer J'INC is assumed, which can be adjusted/improved iteratively using a feedback control loop. Other approaches such as empirical data based approach may also be utilized.

Figure 8:
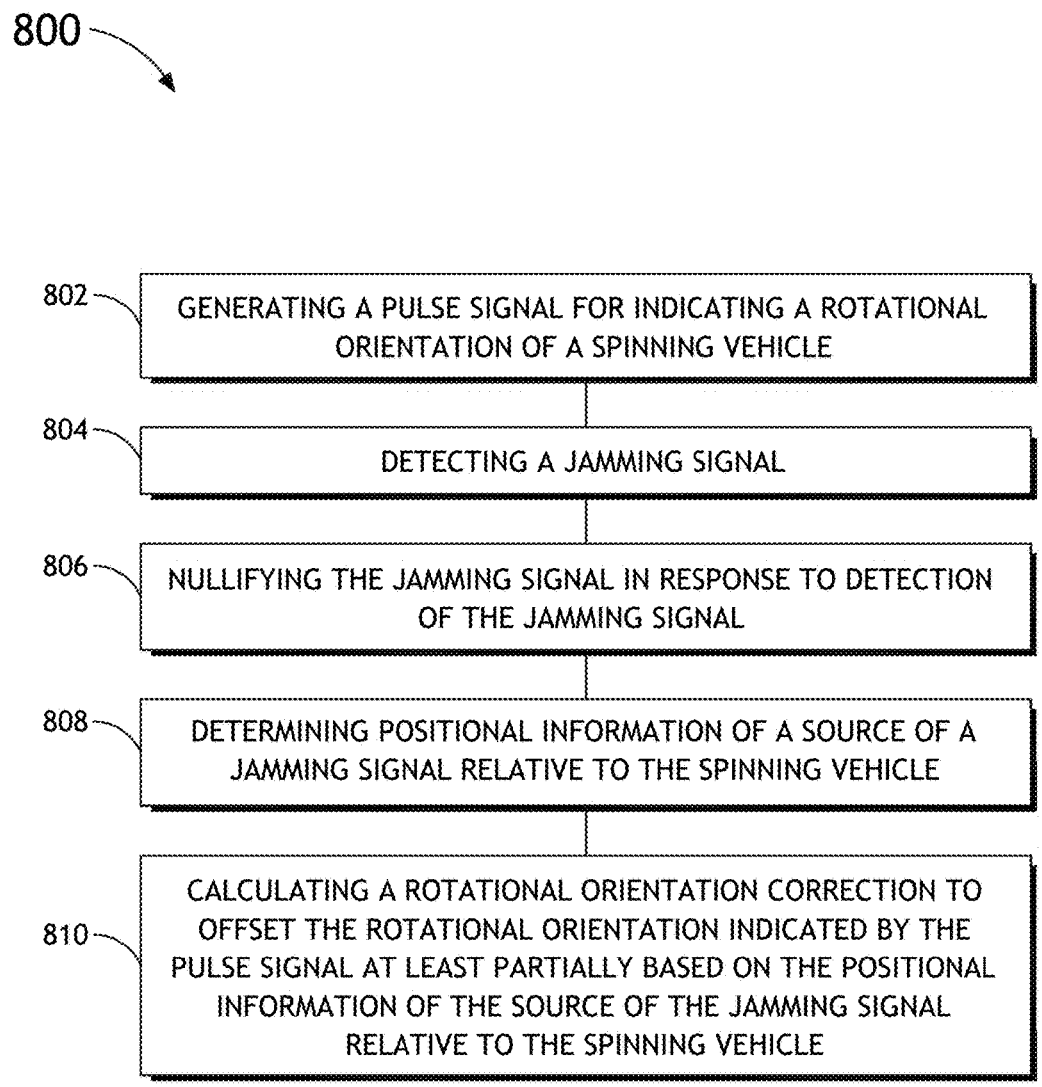
FIG. 8 is a flow diagram depicting an embodiment of a method for providing pulse signal error correction for a spinning vehicle.
Figure 9:
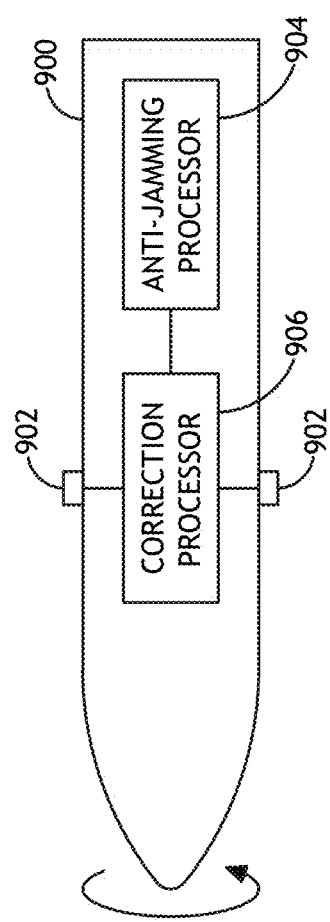
FIG. 9 is a block diagram depicting a spinning vehicle according to an embodiment of the inventive concepts disclosed herein.

Referring now generally to FIGS. 8 and 9. FIG. 8 shows a flow diagram depicting an embodiment of a method 800 for providing pulse signal error correction for a spinning vehicle. FIG. 9 shows a block diagram of the spinning vehicle 900. In a step 802, a plurality of antennas 902 positioned on the spinning vehicle 900 may be utilized to facilitate generation of a pulse signal, which may be used to indicate the rotational orientation of the spinning vehicle 900. The spinning vehicle 900 may include an anti-jamming processor 904. The anti-jamming processor 904 may detect a jamming signal in a step 804, and in response to the detection of the jamming signal, the anti-jamming processor 904 may nullify the jamming signal in a step 806 utilizing digital nulling.

The spinning vehicle 900 may further include a correction processor 906 configured to mitigate potential adverse effects of digital nulling on the accuracy of the pulse signal. As previously described, the correction processor 906 may determine certain positional information regarding a source of the jamming signal (may be referred to as a jammer) relative to the spinning vehicle 900 as well as positional information regarding a navigation satellite (e.g., a GPS satellite) relative to the spinning vehicle 900 in a step 808. The correction processor 906 may also calculate a rotational orientation correction to offset the rotational orientation indicated by the pulse signal at least partially based on the positional information regarding the jammer and the satellite relative to the spinning vehicle 900 in step 810.

It is to be understood that the anti-jamming processor 904 and the correction processor 906 are depicted as separate blocks in FIG. 9 merely for illustrative purposes. The anti-jamming processor 904 and the correction processor 906 may be implemented as separate control circuits or jointly forming an integrated control circuit without departing from the broad scope of the inventive concepts disclosed herein. It is also to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
    a spinning vehicle including a plurality of antennas for generating a pulse signal indicative of a rotational orientation of the spinning vehicle;
    an anti-jamming processor positioned on the spinning vehicle and configured to detect and nullify a jamming signal; and
    a correction processor positioned on the spinning vehicle and configured to determine positional information of a source of the jamming signal relative to the spinning vehicle, to determine positional information of a satellite relative to the spinning vehicle, and to calculate a rotational orientation correction angle to offset the rotational orientation indicated by the pulse signal, wherein the rotational orientation correction angle indicates an angular correction for the rotational orientation of the spinning vehicle in a plane perpendicular to a direction of travel of the spinning vehicle, and wherein the rotational orientation correction angle is calculated at least partially based on the positional information of the source of the jamming signal relative to the spinning vehicle and the positional information of the satellite relative to the spinning vehicle.

2. The apparatus of claim 1, wherein the source of the jamming signal is a jammer, and wherein the positional information of the jammer relative to the spinning vehicle and the positional information of the satellite relative to the spinning vehicle includes:
    a first roll angle of the satellite relative to the spinning vehicle;
    a first incidence angle of the satellite relative to the spinning vehicle;
    a second roll angle of the jammer relative to the spinning vehicle; and
    a second incidence angle of the jammer relative to the spinning vehicle.

3. The apparatus of claim 2, wherein the correction processor is further configured to:
    determine a satellite roll angle offset of a radiation pattern of the plurality of antennas based on the first incidence angle of the satellite relative to the spinning vehicle;
    determine a jammer roll angle offset of the radiation pattern of the plurality of antennas based on the second incidence angle of the jammer relative to the spinning vehicle; and
    calculate a jammer-to-satellite roll correction based on: the first roll angle of the satellite relative to the spinning vehicle, the second roll angle of the jammer relative to the spinning vehicle, the satellite roll angle offset, and the jammer roll angle offset.

4. The apparatus of claim 3, wherein the correction processor is further configured to:
    calculate a jammer incidence correction based on the second incidence angle of the jammer relative to the spinning vehicle.

5. The apparatus of claim 4, wherein the correction processor is further configured to:
    calculate a satellite incidence correction based on the first incidence angle of the satellite relative to the spinning vehicle.

6. The apparatus of claim 5, wherein the rotational orientation correction angle is a sum of the jammer-to-satellite roll correction, the jammer incidence correction, and the satellite incidence correction.

7. The apparatus of claim 2, wherein the correction processor is further configured to:
record strengths of the jamming signal when the plurality of antennas is at approximately $\Delta°$, $\Delta+90°$, $\Delta+180°$, and $\Delta+270°$ about a spinning axis of the spinning vehicle; and
estimate the second roll angle of the jammer relative to the spinning vehicle at least partially based on the recorded strengths of the jamming signal.

8. The apparatus of claim 1, wherein the anti-jamming processor and the correction processor form an integrated processor.

9. A method, comprising:
generating a pulse signal indicative of a rotational orientation of a spinning vehicle;
detecting a jamming signal;
nullifying the jamming signal;
determining positional information of a source of the jamming signal relative to the spinning vehicle;
determining positional information of a satellite relative to the spinning vehicle; and
calculating a rotational orientation correction angle to offset the rotational orientation indicated by the pulse signal, the rotational orientation correction angle being calculated at least partially based on the positional information of the source of the jamming signal relative to the spinning vehicle and the positional information of the satellite relative to the spinning vehicle, the rotational orientation correction angle indicating an angular correction for the rotational orientation of the spinning vehicle in a plane perpendicular to a direction of travel of the spinning vehicle.

10. The method of claim 9, wherein the source of the jamming signal is a jammer, and wherein the positional information of the jammer relative to the spinning vehicle and the positional information of the satellite relative to the spinning vehicle includes:
a first roll angle of the satellite relative to the spinning vehicle;
a first incidence angle of the satellite relative to the spinning vehicle;
a second roll angle of the jammer relative to the spinning vehicle; and
a second incidence angle of the jammer relative to the spinning vehicle.

11. The method of claim 10, wherein the pulse signal is generated based on a navigation signal received at an antenna mounted on the spinning vehicle, and wherein calculating the rotational orientation correction angle to offset the rotational orientation indicated by the pulse signal further comprises:
determining a satellite roll angle offset of a radiation pattern of the plurality of antennas based on the first incidence angle of the satellite relative to the spinning vehicle;
determining a jammer roll angle offset of the radiation pattern of the plurality of antennas based on the second incidence angle of the jammer relative to the spinning vehicle; and
calculating a jammer-to-satellite roll correction based on: the first roll angle of the satellite relative to the spinning vehicle, the second roll angle of the jammer relative to the spinning vehicle, the satellite roll angle offset, and the jammer roll angle offset.

12. The method of claim 11, wherein calculating the rotational orientation correction angle to offset the rotational orientation indicated by the pulse signal further comprises:
calculating a jammer incidence correction based on the second incidence angle of the jammer relative to the spinning vehicle; and
calculating a satellite incidence correction based on the first incidence angle of the satellite relative to the spinning vehicle.

13. The method of claim 12, wherein the rotational orientation correction angle is a sum of the jammer-to-satellite roll correction, the jammer incidence correction, and the satellite incidence correction.

14. The method of claim 10, wherein the pulse signal is generated based on a navigation signal received at an antenna mounted on the spinning vehicle, the method further comprising:
recording strengths of the jamming signal when the antenna is at approximately $\Delta°$, $\Delta+90°$, $\Delta+180°$, and $\Delta+270°$ about a spinning axis of the spinning vehicle; and
estimating the second roll angle of the jammer relative to the spinning vehicle at least partially based on the recorded strengths of the jamming signal.

15. A method, comprising:
generating a pulse signal indicative of a rotational orientation of a spinning vehicle, the pulse signal being generated based on a navigation signal received at an antenna mounted on the spinning vehicle;
detecting a jamming signal;
nullifying the jamming signal;
determining positional information of a source of the jamming signal relative to the spinning vehicle, including: a first roll angle of the jammer relative to the spinning vehicle, and a first incidence angle of the jammer relative to the spinning vehicle;
determining positional information of a satellite relative to the spinning vehicle, including: a second roll angle of the satellite relative to the spinning vehicle, and a second incidence angle of the satellite relative to the spinning vehicle; and
calculating a rotational orientation correction angle to offset the rotational orientation indicated by the pulse signal, the rotational orientation correction angle indicating an angular correction for the rotational orientation of the spinning vehicle in a plane perpendicular to a direction of travel of the spinning vehicle, the rotational orientation correction angle being calculated at least partially based on: the second roll angle of the satellite relative to the spinning vehicle, the second incidence angle of the satellite relative to the spinning vehicle, the first roll angle of the jammer relative to the spinning vehicle, and the first incidence angle of the jammer relative to the spinning vehicle.

16. The method of claim 15, wherein calculating the rotational orientation correction angle to offset the rotational orientation indicated by the pulse signal further comprises:
determining a satellite roll angle offset of a radiation pattern of the plurality of antennas based on the first incidence angle of the satellite relative to the spinning vehicle;
determining a jammer roll angle offset of the radiation pattern of the plurality of antennas based on the second incidence angle of the jammer relative to the spinning vehicle; and
calculating a jammer-to-satellite roll correction based on: the first roll angle of the satellite relative to the spinning vehicle, the second roll angle of the jammer relative to the spinning vehicle, the satellite roll angle offset, and the jammer roll angle offset.

17. The method of claim 16, wherein calculating the rotational orientation correction angle to offset the rotational orientation indicated by the pulse signal further comprises:
   calculating a jammer incidence correction based on the second incidence angle of the jammer relative to the spinning vehicle.

18. The method of claim 17, wherein calculating the rotational orientation correction angle to offset the rotational orientation indicated by the pulse signal further comprises:
   calculating a satellite incidence correction based on the first incidence angle of the satellite relative to the spinning vehicle.

19. The method of claim 18, wherein the rotational orientation correction angle is a sum of the jammer-to-satellite roll correction, the jammer incidence correction, and the satellite incidence correction.

20. The method of claim 15, further comprising:
   recording strengths of the jamming signal when the antenna is at approximately $\Delta°$, $\Delta+90°$, $\Delta+180°$, and $\Delta+270°$ about a spinning axis of the spinning vehicle; and
   estimating the second roll angle of the jammer relative to the spinning vehicle at least partially based on the recorded strengths of the jamming signal.

* * * * *